E. P. WELLS.
REINFORCED CONCRETE CONSTRUCTION.
APPLICATION FILED NOV. 10, 1904.
955,236.  Patented Apr. 19, 1910.
Witnesses
Inventor

UNITED STATES PATENT OFFICE.

EDMUND PERCY WELLS, OF CLAPHAM, LONDON, ENGLAND, ASSIGNOR TO UNIT CONCRETE STEEL FRAME COMPANY, OF CAMDEN, NEW JERSEY, A CORPORATION OF NEW JERSEY.

REINFORCED CONCRETE CONSTRUCTION.

955,236.  Specification of Letters Patent.  Patented Apr. 19, 1910.

Application filed November 10, 1904. Serial No. 232,206.

*To all whom it may concern:*

Be it known that I, EDMUND PERCY WELLS, a subject of the King of Great Britain, residing at 94 Larkhall Rise, Clapham, in the county of London, England, have invented new and useful Improvements in Reinforced Concrete Construction, of which the following is a specification.

This invention relates to reinforced concrete structures, such as floors, girders, beams, piles, columns, walls, arches and the like, of the kind wherein a skeleton comprising a number of bars or rods of iron or steel is embedded in concrete. In such structures as heretofore made, the said iron or steel rods or bars are frequently supported upon stirrups which extend up into the upper part of the structure and have their ends turned or bent outward so as to afford a grip between the concrete and stirrup.

Now, it is found that in building up this type of girders, floors or the like the stirrups are liable to become displaced from their correct positions, so that the rods are not properly supported, whereby the girder or the like may be materially weakened and it is the object of my invention to overcome this defect.

According to the invention, in lieu of employing stirrups with outwardly bent ends, I make use of hangers of iron or steel one or both ends of which is or are bent around the rods and the shanks of which are provided with a number of cup-like depressions into which, in the formation of the structure, the concrete is well rammed, so as to provide a number of keys which securely prevent the drawing of the hanger through the concrete when the structure is loaded. My improved hangers also serve for bending the several layers of concrete together, and do not require the bending of their ends to prevent slipping.

The rods forming the skeleton can be of any suitable shape say, round, oval or square; or I may make use of rods comprising two cylindrical parts connected together longitudinally by an intermediate diaphragm or web formed in rolling the rods.

In the accompanying drawing:—Figure 1 is an elevation illustrating a skeleton construction of double rods with diaphragm and hangers suitable for beams, floors, etc. Fig. 2 is a side view of a portion of one of the hangers. Fig. 3 is a section on the line 3—3, Fig. 2, and Figs. 4, 5, 6, 7 and 8 are sectional views illustrating different forms of rods and the method of connecting the hangers thereto. Figs. 9 and 10 are respectively an elevation and a plan of slightly modified constructions of cranked rods and hangers for beams, floors and the like. Fig. 11 is a longitudinal section of a beam showing the application of my skeleton of double rods and hangers. Fig. 12 is a transverse section thereof, and Fig. 13 is a section of a concrete column, pile, or arched beam reinforced according to my invention.

*a, a* represent the rods forming the skeleton of the reinforced structure, the said rods being, as above described, of any suitable shape in cross section, such for example, as circular, as shown in Fig. 4, or of a double circle connected together longitudinally by the diaphragm or web *b*, as shown in Figs. 5, 6, 7 and 8.

*c, c* represent the improved hangers, the said hangers being made of iron or steel and being adapted to be bent around the rods *a, a* at one or both ends, and being provided with the cup-like depressions *d, d* clearly shown in Figs. 2 and 3. In the formation of the structure the concrete is well rammed and enters the depressions *d* so as to provide a number of keys which prevent the hanger being drawn through the concrete when the structure is under load. As above mentioned, the hanger serves also for bonding the several layers of concrete together and it is not necessary to bend their ends to prevent slipping.

In building up a reinforced structure with my improved hangers and with the double rods shown in Figs. 5 to 8, the said rods may be arranged either upright, as shown in Figs. 5, 6 and 7 or horizontal as shown in Fig. 8. Furthermore, the hanger may be connected to the rods in a number of ways. Fig. 6, for example, shows the hanger at its lower end passed through a slot in the diaphragm *b* and bent around the upper half of the double rod. In Fig. 7 the lower end of the hanger is bent around both the sections of the rod, and Fig. 8 shows a method of connection similar to that shown in Fig. 6, but applied to the double rod when laid flat.

Where the floors, beams or other structures are of small span only the rods a are preferably laid flat and as close to the tension member as possible, but when the span is large, then a portion of the diaphragm or web b is cut. In this case the upper section of the rod is cranked or curved so as to extend upward into the structure, as clearly indicated in Fig. 1. Or, where the rods are laid flat, as in Fig. 8, one of the parallel sections is bent upward into the structure as indicated in Fig. 9.

Fig. 10 illustrates a construction of skeleton where the rods are laid flat and in which the diaphragm b is cut at each end, and the two sections of the rod at the cut part are spread or splayed out so as to better resist the shearing forces at the points of support.

Figs. 11 and 12 illustrate a reinforced concrete beam having a skeleton provided with my improved hangers and rods. In the arrangement here shown the skeleton is of the form indicated in Fig. 1, the beam being further provided with a series of bonders e, e having cup-like depressions of the kind shown at d, Figs. 2 and 3.

Fig. 13 represents a section of a column, pile or arched beam consisting of a mass of concrete reinforced by a skeleton comprising four double cylindrical rods of the kind shown in Fig. 5 held together by round iron or steel or hoop iron rods f, f, either passed around the outside of the rectangularly placed rods or through slots in the webs b thereof.

Having now particularly described and ascertained the nature of my said invention and in what manner the same is to be performed, I declare that what I claim is:—

1. A metallic skeleton for reinforced concrete structures, comprising a number of rods or bars and hangers consisting of metal bars provided with cup-like depressions, the said hangers being wrapped around the rods, substantially as hereinbefore described.

2. A metallic skeleton for reinforcing concrete structures, comprising a number of rods consisting of two cylindrical parts connected together by an intermediate diaphragm or web and a series of hanger bars provided with cup-like depressions and secured to the rods by being wrapped around the whole rod, substantially as hereinbefore described.

3. A metal skeleton for reinforcing concrete structures, comprising a series of rods consisting of two cylindrical parts connected together longitudinally by a web, the said web being cut at the ends and the two cylindrical parts being opened out in the same plane or cranked, and hangers consisting of metal bars provided with cup-like depressions wrapped around said rods.

4. In a reinforcing means for a cementitious body, a plurality of main reinforcing elements, members rigidly connecting said elements at their central portions and forming part of said reinforcing means, said elements being disconnected at outer portions of said body and separated to reinforce opposite parts of said body, and hangers provided with cup-like depressions wrapped around said elements.

5. In a reinforcing means for a cementitious body, a plurality of main reinforcing elements located adjacent one side of said body, members rigidly connecting said elements at their central portions and forming a part of said reinforcing means, said elements being disconnected at outer end portions of said body and disposed adjacent to opposite sides thereof, and hangers provided with cup-like depressions wrapped around said elements.

6. In a reinforcing means for a cementitious body, a plurality of main reinforcing elements located adjacent to one side of said body, members rigidly connecting said elements at their central portions and forming a part of said reinforcing means, said elements being disconnected at the outer end portions of said body and disposed adjacent to opposite sides thereof, and minor elements or stirrups provided with cup-like depressions wrapped around said connecting members where said main elements are separated.

7. Reinforcing means for a cementitious body comprising a bar having a series of main elements connected by a web at one portion said main elements being disconnected at other portions to form longitudinal main truss elements or bars at other portions diverging from said connected portion, and hangers provided with cup-like depressions wrapped around said bars.

8. The combination with a cementitious body of a reinforcing bar having a series of main elements connected by an intermediate web, said main elements being disconnected at different portions of said bar by severing said web, so as to form longitudinal truss elements diverging from said connected portion, and hangers provided with cup-like depressions wrapped around said bars.

9. The combination with a cementitious body, of a reinforcing bar having a plurality of main elements connected by an intermediate web, said main elements being disconnected and separated by severing said webs at different portions, and hangers provided with cup-like depressions wrapped around said bars.

10. The combination with a cementitious body of a reinforcing bar having a plurality of main elements connected by an intermediate web, said main elements being disconnected and separated by severing said webs at at different portions, and said web being cut away at other portions without separating the main elements to facilitate the attachment of hangers, substantially as described.

EDMUND PERCY WELLS.

Witnesses:
 JOHN E. BOUSFIELD,
 C. G. REDFERN.